July 11, 1972 H. Z. HIGHT ET AL 3,676,254

INTERNALLY SEALING PIPE JOINT

Filed Feb. 20, 1970

INVENTORS:
HANFORD Z. HIGHT
STEPHEN LESKY

BY Richard S. Shreve

ATTORNEY

United States Patent Office

3,676,254
Patented July 11, 1972

3,676,254
INTERNALLY SEALING PIPE JOINT
Hanford Z. Hight, Short Hills, and Stephen Lesky, Metuchen, N.J., assignors to Bonded Products, Inc., South Orange, N.J.
Filed Feb. 20, 1970, Ser. No. 13,116
Int. Cl. B29c 17/00
U.S. Cl. 156—286                                    8 Claims

ABSTRACT OF THE DISCLOSURE

Epoxy resin sealing material is loaded onto a plunger in pipe behind a vacuum chamber therein, which chamber exhausts annular cavity of bell and spigot joint, and plunger is pulled to force material against vacuum chamber wall and into exhausted cavity.

BACKGROUND

This invention relates to the sealing internally of cast iron pipes having bell and spigot joints. The big problem with cast iron pipe is to seal the bell and spigot joints because the pipe itself is so thick that normally it is not subject to holes from the effects of corrosion. But there is a problem at the joints because with the bell and spigot type joint there is a cavity deeper than the inside diameter of the pipe itself. When an attempt is made to fill this cavity, air can be trapped within the cavity so that no matter what pressure might be put on the sealing material an equal pressure is developed with the trapped air, so that immediately after the sealing operation, the air forces its way out and no seal has been made.

SUMMARY

The object of the present invention is to suck all of the air out of this cavity by means of a vacuum, so that the cavity exhausted of any air will accept sealing material which by its nature will stay in place in the cavity of the joint.

According to the present invention a vacuum chamber is inserted into the pipe in communication with the cavity of the joint, with a plunger spaced beyond the vacuum chamber, sealing material is loaded into the pipe and behind the vacuum chamber, and the loaded plunger is advanced toward the vacuum chamber while the chamber is exhausting the cavity, whereby the exhausted cavity draws the material thereinto aided by the plunger. Preferably the plunger is advanced by a cable passing through a tube in said vacuum chamber. Preferably the location of the vacuum chamber is determined by indication of the degree of vacuum in the system. Preferably the vacuum chamber has a rear wall with apertures communicating with the space ahead of the loaded plunger.

Figure 1:
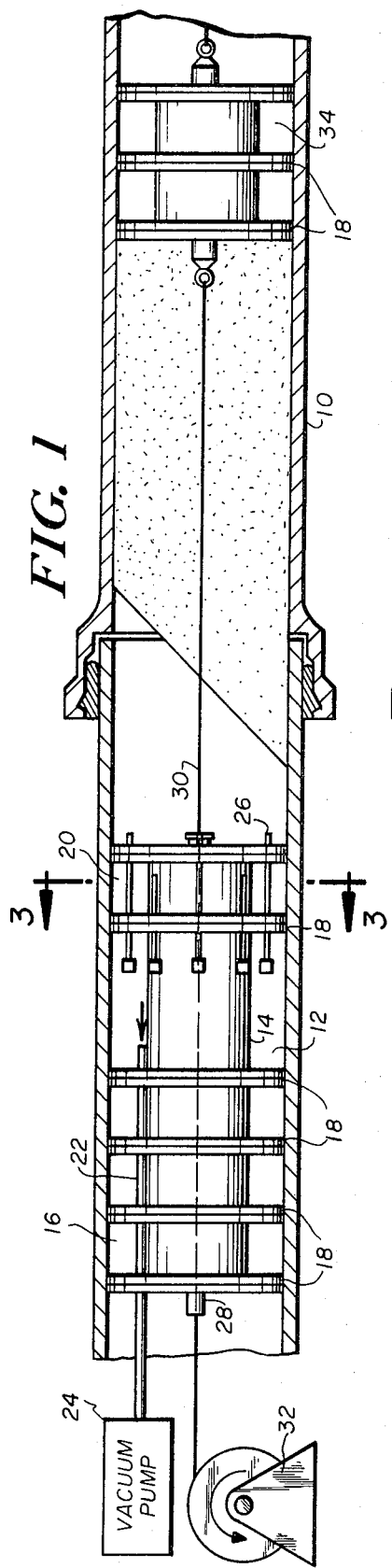
FIG. 1 is a longitudinal section through a pipe having a bell and spigot joint being sealed according to the preferred embodiment of the present invention.
Figure 2:
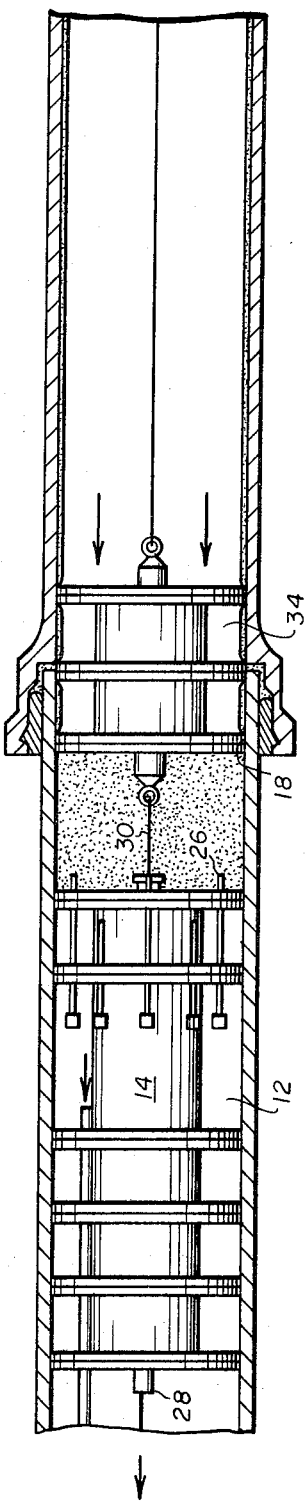
FIG. 2 is a similar view of the same after the sealing of the joint is completed.
Figure 3:
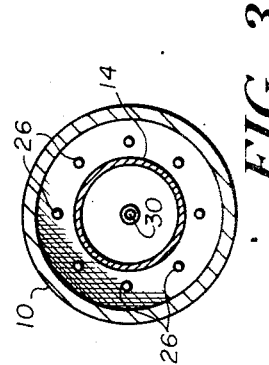
FIG. 3 is a section taken along the line 3—3 of FIG. 1.

As shown the pipe 10 to be sealed contains a bell and spigot joint to be sealed. Inside the pipe is a vacuum chamber 12 comprising a central longitudinal barrel 14. The chamber 12 has a front end 16 slidably sealed inside the pipe by a plurality of successive sealing rings secured to the outside of the barrel 14.

Each of the sealing rings 18 comprises a pliable centrally apertured disk, preferably of rubber, backed by a star member of similar material. In the form shown, the front end 16 has four sealing rings 18, with separate compartments therebetween. The rear end 20 has a smaller number of wall members 18 of the same construction.

The vacuum chamber proper is between the front end 16 and the rear end 20, outside of the barrel 14, all inside the pipe 10 being sealed. A vacuum hose 22 extends from this chamber through the walls 18 of the front end to a vacuum pump 24. The rear end 20 has vents 26 extending through the walls thereof out beyond the end.

A tube 28 passes through all of the walls of both the front and rear ends of the vacuum unit 12. Through this tube 28 passes a cable 30 extending rearwardly from a winch 32 and attached to a plunger 34, which has a barrel and successive sealing members 18.

In operation, to seal the joints after preliminary cleaning of the pipe by conventional means, the first step is to get a cable 30 through the pipe to pull the apparatus. The first element to be put into the pipe is the movable vacuum unit 12. To this is attached the cable 30, which runs through the pipe 28 to the winch 32, where the pulling is done, and which is attached or connected to the vacuum pump 24. Starting up the vacuum pump then exhausts the air from the chamber outside the barrel 14 and between the front and rear ends of the unit. Through this unit is passed the pulling cable 30 in the pipe 28, so that the cable is not attached in any way to the vacuum chamber itself. This pulling cable 30 passes on to be attached to the plunger 34.

The vacum chamber 12 is first put into the pipe and then pushed forward with a rod a sufficient distance, five to ten feet, to leave space behind it to load in the sealing material, such as epoxy resin composition. After the material is loaded into the pipe, the winch 32 is operated to draw the cable 30 to pull the plunger 34 into the pipe behind the material. It is the plunger being pulled against the material which in turn moves the vacuum chamber 12 along, because it is really floating on the cable, not being attached.

When the material is loaded into the pipe there obviously is air in the pipe and in the material also. This must be exhausted so that no air from the material can enter the cavity of the joint and recreate the problem. The way the air is exhausted from the material is by the vents 26 from the vacuum chamber which run back to the material area. Before the whole assembly is really started to move, the plunger 34 is pulled forward to pack the material, while at the same time the air is being sucked out of the material. When the air is exhausted, this will be known because the vacuum gauge will show up around 28″ or so of vacuum.

Now the operation is ready to pull the whole assembly through the pipe. As the vacuum chamber passes over a joint, there is a drop in vacuum noted on the gauge at the pump as the vacuum chamber exhausts the air from the cavity at this point. When the gauge shows that vacuum has returned, the pulling of the assembly on through the pipe is resumed. The material is directly behind the vacuum chamber and more or less provides the vacuum seal at the back of the chamber. When the material passes over the cavity from which the air has been exhausted, it quickly fills the complete cavity area so that the joint is effectively sealed.

When the vacuum falls off only slightly at a joint, this is because the joint is at least tight against any present leakage, so that it is only necessary to exhaust the relatively small amount of air that is in the cavity. If the joint were leaking badly, the vacuum gauge would fall way off. If the vacuum does not come back up, it is known from the gauge that the joint must be leaking, in which case no air would be trapped, and the material goes up in the joint as the plunger moves along.

This development is primarily for use on gas mains. It is expected to do approximately 500 feet of main at a time. In other words, there would be two openings 500 feet apart. At one opening there would be the winch and vacuum pump and at the other end is where the loading of the sealing material is done.

What is claimed is:

1. Method of preventing leakage of a pipe joint having a cavity, which comprises
    inserting into the pipe sealing rings engaging the inside of the pipe and forming therewith a vacuum chamber,
    inserting into said pipe a plunger following said vacuum chamber,
    loading sealing material into said pipe ahead of said plunger and behind said vacuum chamber,
    drawing a vacuum in said chamber,
    advancing said chamber into communication with said cavity to exhaust air therefrom, and
    advancing said loaded plunger to fill said exhausted cavity with said sealing material.

2. Method as claimed in claim 1, in which said loading of sealing material traps air between said vacuum chamber and the material ahead of said plunger, and
    said vacuum chamber exhausts said trapped air as well as said cavity.

3. Method as claimed in claim 1, in which said pipe joint is a bell and spigot joint,
    said cavity is annular, and
    said material is an epoxy resin composition.

4. Method as claimed in claim 1, in which said vacuum chamber is advanced by thrust of the sealing material being advanced by said plunger.

5. Method as claimed in claim 1, in which the longitudinal location of said vacuum chamber in communication with said cavity is indicated by the degree of vacuum in the system.

6. Apparatus for preventing leakage of a pipe joint having a cavity, which comprises
    sealing means inserted into said pipe forming therewith a vacuum chamber,
    a plunger inserted into said pipe following said vacuum chamber,
    means for drawing a vacuum in said chamber,
    said pipe ahead of said plunger and behind said vacuum chamber being loaded with sealing material,
    means for advancing said chamber into communication with said cavity to exhaust air therefrom,
    and means for advancing said loaded plunger to fill said exhausted cavity with said sealing material.

7. Apparatus as claimed in claim 6, in which a tube extends longitudinally through said vacuum chamber,
    and said advancing means comprises a cable passing through said tube.

8. Apparatus as claimed in claim 6, in which said vacuum chamber has front and rear walls, and
    said rear wall has apertures communicating with the space ahead of the loaded plunger.

References Cited
UNITED STATES PATENTS

| | | | |
|---|---|---|---|
| 3,405,019 | 10/1968 | Seil et al. | 156—286 |
| 3,400,028 | 9/1968 | Wikholm | 156—286 |
| 3,560,295 | 2/1971 | Kimbrell et al. | 156—287 |
| 2,745,778 | 5/1956 | Garten | 156—287 |

CARL D. QUARFORTH, Primary Examiner

S. R. HELLMAN, Assistant Examiner

U.S. Cl. X.R.

156—287, 294, 330, 382, 547